United States Patent
Nott et al.

(10) Patent No.: US 12,061,470 B2
(45) Date of Patent: Aug. 13, 2024

(54) GUIDED OPERATION BY ROBOTIC PROCESSES

(71) Applicant: UiPath, Inc., New York, NY (US)

(72) Inventors: Brandon Nott, Bellevue, WA (US); Florin-Radu Tapus, Bucharest (RO); Justin Marks, Redmond, WA (US)

(73) Assignee: UiPath, Inc., New York, NY (US)

( * ) Notice: Subject to any disclaimer, the term of this patent is extended or adjusted under 35 U.S.C. 154(b) by 169 days.

(21) Appl. No.: 17/112,113

(22) Filed: Dec. 4, 2020

(65) Prior Publication Data

US 2022/0176552 A1  Jun. 9, 2022

(51) Int. Cl.
*G06F 9/451* (2018.01)
*G05D 1/00* (2024.01)

(52) U.S. Cl.
CPC ......... *G05D 1/0016* (2013.01); *G05D 1/0219* (2013.01); *G05D 1/0268* (2013.01); *G06F 9/453* (2018.02)

(58) Field of Classification Search
CPC .. G05D 1/0016; G05D 1/0219; G05D 1/0268; G06F 9/453
See application file for complete search history.

(56) References Cited

U.S. PATENT DOCUMENTS

| | | | | |
|---|---|---|---|---|
| 7,558,767 B2* | 7/2009 | Scarborough | ........ | G06Q 10/063 706/45 |
| 7,805,382 B2* | 9/2010 | Rosen | .................... | G06Q 10/10 705/321 |
| 7,984,014 B2* | 7/2011 | Song | ........................ | G06N 5/02 707/665 |
| 9,569,231 B2 | 2/2017 | Butin et al. | | |
| 10,496,420 B2 | 12/2019 | Illindala et al. | | |
| 10,575,231 B2* | 2/2020 | Gay | .................... | H04W 36/026 |
| 10,606,618 B2 | 3/2020 | Lubow et al. | | |
| 10,635,461 B2 | 4/2020 | Padmanabhan et al. | | |
| 10,908,984 B2* | 2/2021 | Johnson | ............... | G06F 11/3006 |
| 11,075,794 B2* | 7/2021 | McConnell | ............. | H04L 63/08 |
| 11,256,542 B2* | 2/2022 | Johnson | .................... | G06N 7/01 |

(Continued)

FOREIGN PATENT DOCUMENTS

| | | |
|---|---|---|
| CN | 111985895 A | 11/2020 |
| EP | 3675008 A1 | 7/2020 |

(Continued)

OTHER PUBLICATIONS

International Search Report and Written Opinion for PCT/US2021/056863 dated Feb. 28, 2022.

*Primary Examiner* — Tadesse Hailu
(74) *Attorney, Agent, or Firm* — Volpe Koenig

(57) ABSTRACT

A method is disclosed. The method is implemented by a robot engine that is stored as program code on a memory of a system. The program code is executed by a processor of the system, which enables robotic process automations of the robot engine. The processor is communicatively coupled to the memory within the system. The method includes initiating a guided operation of a platform presented by the system and monitoring the guided operation to observe an interaction with the platform or to receive a direct input by the robot engine. The method also includes executing a backend operation with respect to the interaction or the direct input.

18 Claims, 6 Drawing Sheets

(56) References Cited

U.S. PATENT DOCUMENTS

| | | | | |
|---|---|---|---|---|
| 11,282,405 B2* | 3/2022 | Truong | | G06V 40/174 |
| 11,288,064 B1* | 3/2022 | Monakova | | G06F 8/73 |
| 11,328,524 B2* | 5/2022 | Cristescu | | G06V 10/82 |
| 11,609,772 B2* | 3/2023 | Ignatowicz | | G06F 9/453 |
| 2006/0013552 A1* | 1/2006 | Wentworth | | G02B 6/4439 |
| | | | | 385/134 |
| 2012/0311538 A1* | 12/2012 | Bhatia | | G06F 11/32 |
| | | | | 717/126 |
| 2014/0006944 A1 | 1/2014 | Selig et al. | | |
| 2014/0358646 A1* | 12/2014 | Said | | G06Q 10/06398 |
| | | | | 705/7.42 |
| 2015/0032655 A1* | 1/2015 | Said | | H04W 4/21 |
| | | | | 705/321 |
| 2015/0215350 A1* | 7/2015 | Slayton | | G06F 9/453 |
| | | | | 709/204 |
| 2016/0259717 A1* | 9/2016 | Nychis | | G06F 11/32 |
| 2016/0275454 A1* | 9/2016 | Shiryaev | | G06Q 10/1053 |
| 2017/0132549 A1 | 5/2017 | Ezry et al. | | |
| 2017/0352041 A1* | 12/2017 | Ramamurthy | | G06N 5/043 |
| 2018/0012170 A1* | 1/2018 | Roberts | | G06F 16/24578 |
| 2018/0321833 A1 | 11/2018 | Nelson et al. | | |
| 2018/0361583 A1* | 12/2018 | Williams | | G05D 1/024 |
| 2019/0053991 A1* | 2/2019 | Krishna | | A61K 8/44 |
| 2019/0129824 A1* | 5/2019 | Radhakrishnan | ... | G06F 11/0787 |
| 2019/0141596 A1* | 5/2019 | Gay | | H04W 36/026 |
| 2020/0090150 A1* | 3/2020 | Chu | | G06Q 30/0633 |
| 2020/0098275 A1* | 3/2020 | Doti | | G06F 8/34 |
| 2020/0111377 A1* | 4/2020 | Truong | | G09B 5/12 |
| 2020/0147791 A1* | 5/2020 | Safary | | G06N 20/00 |
| 2020/0160745 A1* | 5/2020 | Jain | | G09B 5/02 |
| 2020/0180155 A1 | 6/2020 | Hall | | |
| 2020/0279205 A1* | 9/2020 | Gong | | G06N 20/20 |
| 2020/0320432 A1* | 10/2020 | Chan | | G05B 17/02 |
| 2020/0364588 A1* | 11/2020 | Knox | | G06V 40/20 |
| 2021/0133652 A1* | 5/2021 | Khalid | | G06Q 10/06311 |
| 2021/0209682 A1* | 7/2021 | Jain | | H04L 9/3239 |
| 2021/0329128 A1* | 10/2021 | Kadakia | | H04M 3/5231 |
| 2021/0358032 A1* | 11/2021 | Cella | | G06F 3/015 |
| 2022/0083330 A1* | 3/2022 | Monakova | | G06F 9/453 |
| 2022/0101239 A1* | 3/2022 | Molter | | G06Q 50/26 |
| 2022/0147386 A1* | 5/2022 | Goyal | | G06F 9/4843 |

FOREIGN PATENT DOCUMENTS

| | | |
|---|---|---|
| KR | 1020050003230 A | 1/2005 |
| KR | 1020180057990 A | 5/2018 |

* cited by examiner

GUIDED OPERATION BY ROBOTIC PROCESSES

BACKGROUND

Conventionally, many companies and enterprises have onboarding programs to train new employees, along with training sessions to teach current employees new or updated software implementations or workflow procedures.

In an example, document-based solutions (e.g., "electronic help" guides) are commonly used in both onboarding programs and training sessions. These "electronic help" guides are typically organized by categories and/or tasks (e.g., login errors, data exporting, etc.) and provide instructions for using graphic user interface (GUI) elements to perform certain tasks. Yet, document-based solutions are typically cumbersome, application specific, incomplete, and can be ignored or become quickly outdated given the pace with which software, procedures, and general workplace environments are modified and upgraded.

Both onboarding programs and training sessions require significant resources (e.g., employee time and production costs). At present, companies and enterprises may automate onboarding programs and training sessions in an attempt to reduce these resources, yet conventional automation typically focuses in a singular manner to a specific process or task within separate and independent systems and applications (e.g., siloed automation). As such, companies and enterprises are still burdened with conventional onboarding programs and training sessions across disparate systems and applications to synthesize employee skillsets.

SUMMARY

According to one or more embodiments, a method is disclosed. The method is implemented by a robot engine that is stored as program code on a memory of a system. The program code is executed by a processor of the system, which enables robotic process automations of the robot engine. The processor is communicatively coupled to the memory within the system. The method includes initiating a guided operation of a platform presented by the system and monitoring the guided operation to observe an interaction with the platform or to receive a direct input by the robot engine. The method also includes executing a backend operation with respect to the interaction or the direct input.

According to one or more embodiments, the computing device embodiment above can be implemented as a method, an apparatus, a system, and/or a computer program product.

BRIEF DESCRIPTION OF THE DRAWING(S)

A more detailed understanding may be had from the following description, given by way of example in conjunction with the accompanying drawings, wherein like reference numerals in the figures indicate like elements, and wherein.

DETAILED DESCRIPTION

Disclosed herein is a robot engine according to one or more embodiments. The robot engine includes software and/or hardware that performs functions of guided operation by robotic processes. More particularly, the robot engine provides a method to initiate and monitor a set of guided operations in a computing system, where the robot engine can be a combination of hardware and software (e.g., processor executable code that is necessarily rooted in the hardware), to support the adoption of one or more software platforms.

In this regard, the method includes initiating a guided operation of a platform (e.g., a localized or remote, such as a web-based, application) presented by the computing system and monitoring user's activity to observe an interaction with the platform or to receive a direct input by the robot engine. The robot engine can execute additional backend operations in parallel or in sequence to the guided operation and/or in response to the direct input, and can vary or branch the guided operation to an alternative path in response to the interaction or the direct input. The robot engine can also cause transitions within the computing system from the platform to a secondary or tertiary platform presented by the computing system with respect to the interaction or the direct input.

Thus, the method of the robot engine involves an automatic multi-step manipulation of different platforms in connection with guided operations of at least onboarding programs, support functions, and/or training sessions (e.g., a digital adoption platform and/or a guided automation). The technical effects and benefits of the robot engine include enabling automation across platforms that otherwise may not be available with conventional onboarding programs and training sessions.

For the methods and processes described herein, the steps recited may be performed out of sequence in any order and sub-steps not explicitly described or shown may be performed. In addition, "coupled" or "operatively coupled" may mean that objects are linked but may have zero or more intermediate objects between the linked objects. Also, any combination of the disclosed features/elements may be used in one or more embodiments. When referring to "A or B", it may include A, B, or A and B, which may be extended similarly to longer lists. When using the notation X/Y it may include X or Y. Alternatively, when using the notation X/Y it may include X and Y. X/Y notation may be extended similarly to longer lists with the same explained logic.

Figure 1A:
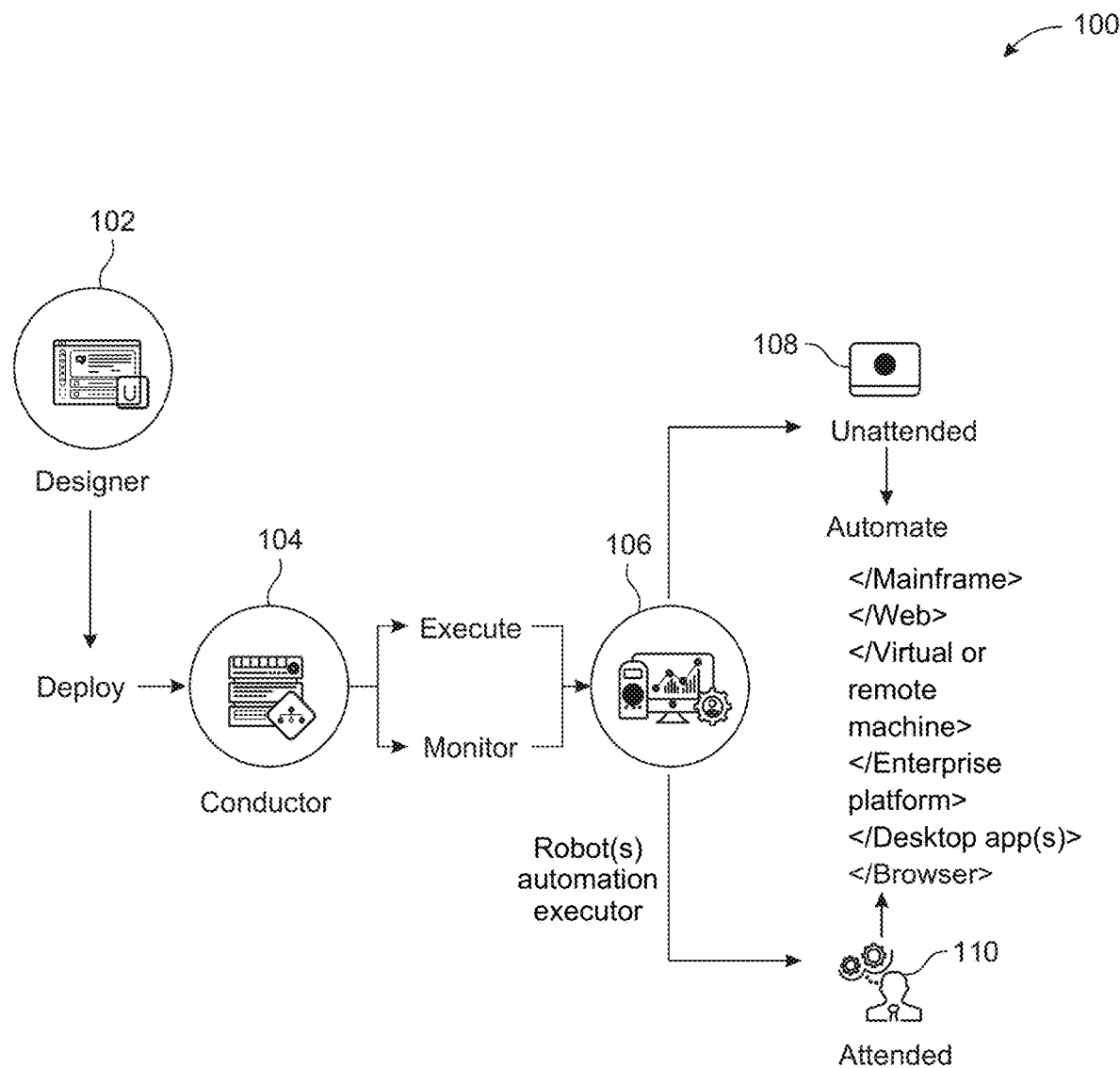
FIG. 1A is an illustration of robotic process automation (RPA) development, design, operation, or execution according to one or more embodiments.

FIG. 1A is an illustration of RPA development, design, operation, or execution 100. Designer 102, sometimes referenced as a studio, development, or online platform including one or more engines (e.g., a robot engine), development environment, or the like may be configured to generate code, instructions, commands, or the like for a robot to perform or automate one or more workflows. From a selection(s), which the computing system may provide to the robot, the robot may determine representative data of the area(s) of the visual display selected by a user or operator. As part of RPA, shapes such as squares, rectangles, circles, polygons, freeform, or the like in multiple dimensions may be utilized for UI robot development and runtime in relation to a computer vision (CV) operation or machine learning (ML) model.

Non-limiting examples of operations that may be accomplished by a workflow may be one or more of performing log-ins, filling a form, information technology (IT) management, or the like. To run a workflow for UI automation, a robot may need to uniquely identify specific screen elements, such as buttons, checkboxes, text fields, labels, etc., regardless of application access or application development. Examples of application access may be local, virtual, remote, cloud, Citrix®, VMWare®, VNC®, Windows® remote desktop, virtual desktop infrastructure (VDI), or the like. Examples of application development may be win32, Java, Flash, hypertext markup language (HTML), HTML5, extensible markup language (XML), JavaScript, C #, C++, Silverlight, or the like.

A workflow may include, but are not limited to, task sequences, flowcharts, Finite State Machines (FSMs), global exception handlers, or the like. Task sequences may be linear processes for handling linear tasks between one or more applications or windows. Flowcharts may be configured to handle complex business logic, enabling integration of decisions and connection of activities in a more diverse manner through multiple branching logic operators. FSMs may be configured for large workflows. FSMs may use a finite number of states in their execution, which may be triggered by a condition, transition, activity, or the like. Global exception handlers may be configured to determine workflow behavior when encountering an execution error, for debugging processes, or the like.

A robot may include one or more of an application, an applet, a script, or the like, that may automate a UI transparent to an underlying operating system (OS) or hardware. At deployment, one or more robots may be managed, controlled, or the like by a conductor 104, sometimes referred to as an orchestrator. Conductor 104 may instruct or command robot(s) or automation executor 106 to execute or monitor a workflow in a mainframe, web, virtual machine, remote machine, virtual desktop, enterprise platform, online platform, desktop app(s), browser, or the like client, application, or program. Conductor 104 may act as a central or semi-central point to instruct or command a plurality of robots to automate a computing platform (e.g., a design computing platform).

In certain configurations, conductor 104 may be configured for provisioning, deployment, configuration, queueing, monitoring, logging, and/or providing interconnectivity. Provisioning may include creating and maintaining connections or communication between robot(s) or automation executor 106 and conductor 104. Deployment may include assuring the delivery of package versions to assigned robots for execution. Configuration may include maintenance and delivery of robot environments and process configurations. Queueing may include providing management of queues and queue items. Monitoring may include keeping track of robot identification data and maintaining user permissions. Logging may include storing and indexing logs to a database (e.g., an SQL database) and/or another storage mechanism (e.g., ElasticSearch®, which provides the ability to store and quickly query large datasets). Conductor 104 may provide interconnectivity by acting as the centralized point of communication for third-party solutions and/or applications.

Robot(s) or automation executor 106 may be configured as unattended 108 or attended 110. For unattended 108 operations, automation may be performed without third party inputs or control. For attended 110 operation, automation may be performed by receiving input, commands, instructions, guidance, or the like from a third party component. Unattended 108 or attended 110 robots may run or execute on mobile computing or mobile device environments.

A robot(s) or automation executor 106 may be execution agents that run workflows built in designer 102. A commercial example of a robot(s) for UI or software automation is UiPath Robots™. In some embodiments, robot(s) or automation executor 106 may install the Microsoft Windows® Service Control Manager (SCM)-managed service by default. As a result, such robots can open interactive Windows® sessions under the local system account, and have the rights of a Windows® service.

In some embodiments, robot(s) or automation executor 106 may be installed in a user mode. These robots may have the same rights as the user under which a given robot is installed. This feature may also be available for High Density (HD) robots, which ensure full utilization of each machine at maximum performance such as in an HD environment.

In certain configurations, robot(s) or automation executor 106 may be split, distributed, or the like into several components, each being dedicated to a particular automation task or activity. Robot components may include SCM-managed robot services, user mode robot services, executors, agents, command line, or the like. SCM-managed robot services may manage or monitor Windows® sessions and act as a proxy between conductor 104 and the execution hosts (i.e., the computing systems on which robot(s) or automation executor 106 is executed). These services may be trusted with and manage the credentials for robot(s) or automation executor 106.

User mode robot services may manage and monitor Windows® sessions and act as a proxy between conductor 104 and the execution hosts. User mode robot services may be trusted with and manage the credentials for robots. A Windows® application may automatically be launched if the SCM-managed robot service is not installed.

Executors may run given jobs under a Windows® session (i.e., they may execute workflows). Executors may be aware of per-monitor dots per inch (DPI) settings. Agents may be Windows® Presentation Foundation (WPF) applications that display available jobs in the system tray window. Agents may be a client of the service. Agents may request to start or stop jobs and change settings. The command line may be a client of the service. The command line is a console application that can request to start jobs and waits for their output.

In configurations where components of robot(s) or automation executor 106 are split as explained above helps developers, support users, and computing systems more easily run, identify, and track execution by each component. Special behaviors may be configured per component this way, such as setting up different firewall rules for the executor and the service. An executor may be aware of DPI settings per monitor in some embodiments. As a result, workflows may be executed at any DPI, regardless of the configuration of the computing system on which they were created. Projects from designer 102 may also be independent of browser zoom level. For applications that are DPI-unaware or intentionally marked as unaware, DPI may be disabled in some embodiments.

Figure 1B:
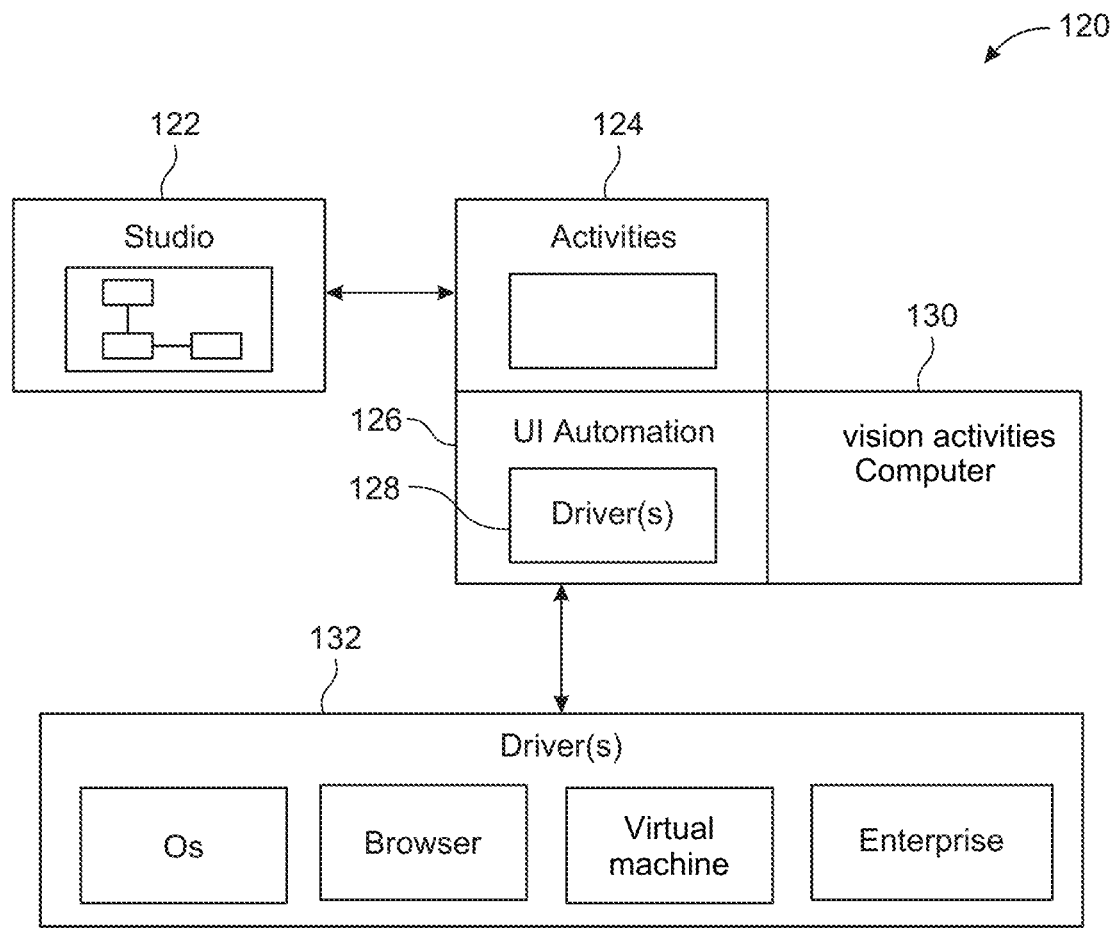
FIG. 1B is another illustration of RPA development, design, operation, or execution according to one or more embodiments.

FIG. 1B is another illustration of RPA development, design, operation, or execution 120. A studio component or module 122 may be configured to generate code, instructions, commands, or the like for a robot to perform one or more activities 124. User interface (UI) automation 126 may be performed by a robot on a client using one or more driver(s) components 128. A robot may perform activities using computer vision (CV) activities module or engine 130 (e.g., a robot engine). Other drivers 132 may be utilized for UI automation by a robot to get elements of a UI. They may include OS drivers, browser drivers, virtual machine drivers, enterprise drivers, or the like. In certain configurations, CV activities module or engine 130 may be a driver used for UI automation.

Figure 1C:
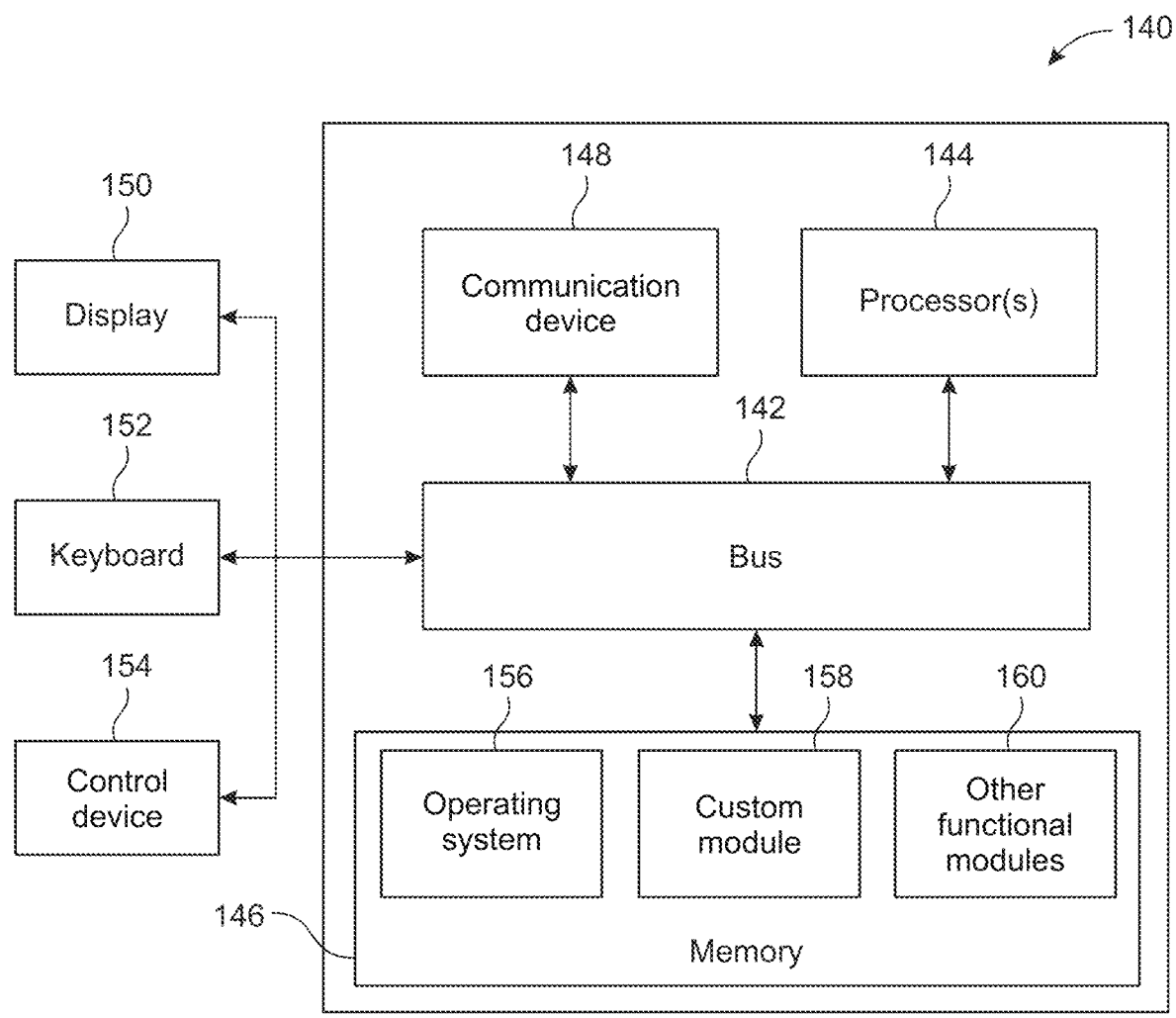
FIG. 1C is an illustration of a computing system or environment according to one or more embodiments.

FIG. 1C is an illustration of a computing system or environment 140 (e.g., hardware supporting an online platform and/or a robot engine) that may include a bus 142 or other communication mechanism for communicating information or data, and one or more processor(s) 144 coupled to bus 142 for processing. One or more processor(s) 144 may be any type of general or specific purpose processor, including a central processing unit (CPU), application specific integrated circuit (ASIC), field programmable gate array (FPGA), graphics processing unit (GPU), controller, multi-core processing unit, three dimensional processor, quantum computing device, or any combination thereof. One or more processor(s) 144 may also have multiple processing cores, and at least some of the cores may be configured to perform specific functions. Multi-parallel processing may also be configured. In addition, at least one or more processor(s) 144 may be a neuromorphic circuit that includes processing elements that mimic biological neurons.

Memory 146 may be configured to store information, instructions (e.g., processor executable instructions of a robot engine, along with distributed packaged processes and configuration files), commands, or data to be executed or processed by processor(s) 144. Memory 146 can be comprised of any combination of random access memory (RAM), read only memory (ROM), flash memory, solid-state memory, cache, static storage such as a magnetic or optical disk, or any other types of non-transitory computer-readable media or combinations thereof. Non-transitory computer-readable media may be any media that can be accessed by processor(s) 144 and may include volatile media, non-volatile media, or the like. The media may also be removable, non-removable, or the like.

Communication device 148, may be configured as a frequency division multiple access (FDMA), single carrier FDMA (SC-FDMA), time division multiple access (TDMA), code division multiple access (CDMA), orthogonal frequency-division multiplexing (OFDM), orthogonal frequency-division multiple access (OFDMA), Global System for Mobile (GSM) communications, general packet radio service (GPRS), universal mobile telecommunications system (UMTS), cdma2000, wideband CDMA (W-CDMA), high-speed downlink packet access (HSDPA), high-speed uplink packet access (HSUPA), high-speed packet access (HSPA), long term evolution (LTE), LTE Advanced (LTE-A), 802.11x, Wi-Fi, Zigbee, Ultra-WideBand (UWB), 802.16x, 802.15, home Node-B (HnB), Bluetooth, radio frequency identification (RFID), infrared data association (IrDA), near-field communications (NFC), fifth generation (5G), new radio (NR), or any other wireless or wired device/transceiver for communication via one or more antennas. Antennas may be singular, arrayed, phased, switched, beamforming, beamsteering, or the like.

One or more processor(s) 144 may be further coupled via bus 142 to a display device 150, such as a plasma, liquid crystal display (LCD), light emitting diode (LED), field emission display (FED), organic light emitting diode (OLED), flexible OLED, flexible substrate displays, a projection display, 4K display, high definition (HD) display, a Retina© display, in-plane switching (IPS) or the like based display. Display device 150 may be configured as a touch, three dimensional (3D) touch, multi-input touch, or multi-touch display using resistive, capacitive, surface-acoustic wave (SAW) capacitive, infrared, optical imaging, dispersive signal technology, acoustic pulse recognition, frustrated total internal reflection, or the like as understood by one of ordinary skill in the art for input/output (I/O).

A keyboard 152 and a control device 154, such as a computer mouse, touchpad, or the like, may be further coupled to bus 142 for input to computing system or environment 140. In addition, input may be provided to computing system or environment 140 remotely via another computing system in communication therewith, or computing system or environment 140 may operate autonomously.

Memory 146 may store software components, modules, engines, or the like that provide functionality when executed or processed by one or more processor(s) 144. This may include an OS 156 for computing system or environment 140. Modules may further include a custom module 158 to perform application specific processes or derivatives thereof. Computing system or environment 140 may include one or more additional functional modules 160 that include additional functionality. For example, the robot engine can be implemented in one or more of the modules 158 and 160 to provide a specific configuring and tooling robotic process automation method to the computing system or environment 140.

Computing system or environment 140 may be adapted or configured to perform as an online platform, a server, an embedded computing system, a personal computer, a console, a personal digital assistant (PDA), a cell phone, a tablet computing device, a quantum computing device, cloud computing device, a mobile device, a smartphone, a fixed mobile device, a smart display, a wearable computer, or the like.

In the examples given herein, modules may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may be at least partially implemented in software for execution by various types of processors. An identified unit of executable code may include one or more physical or logical blocks of computer instructions that may, for instance, be organized as an object, procedure, routine, subroutine, or function. Executables of an identified module co-located or stored in different locations such that, when joined logically together, comprise the module.

A module of executable code may be a single instruction, one or more data structures, one or more data sets, a plurality of instructions, or the like distributed over several different code segments, among different programs, across several memory devices, or the like. Operational or functional data may be identified and illustrated herein within modules, and may be embodied in a suitable form and organized within any suitable type of data structure.

In the examples given herein, a computer program may be configured in hardware, software, or a hybrid implementation. The computer program may be composed of modules that are in operative communication with one another, and to pass information or instructions.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Figure 2:
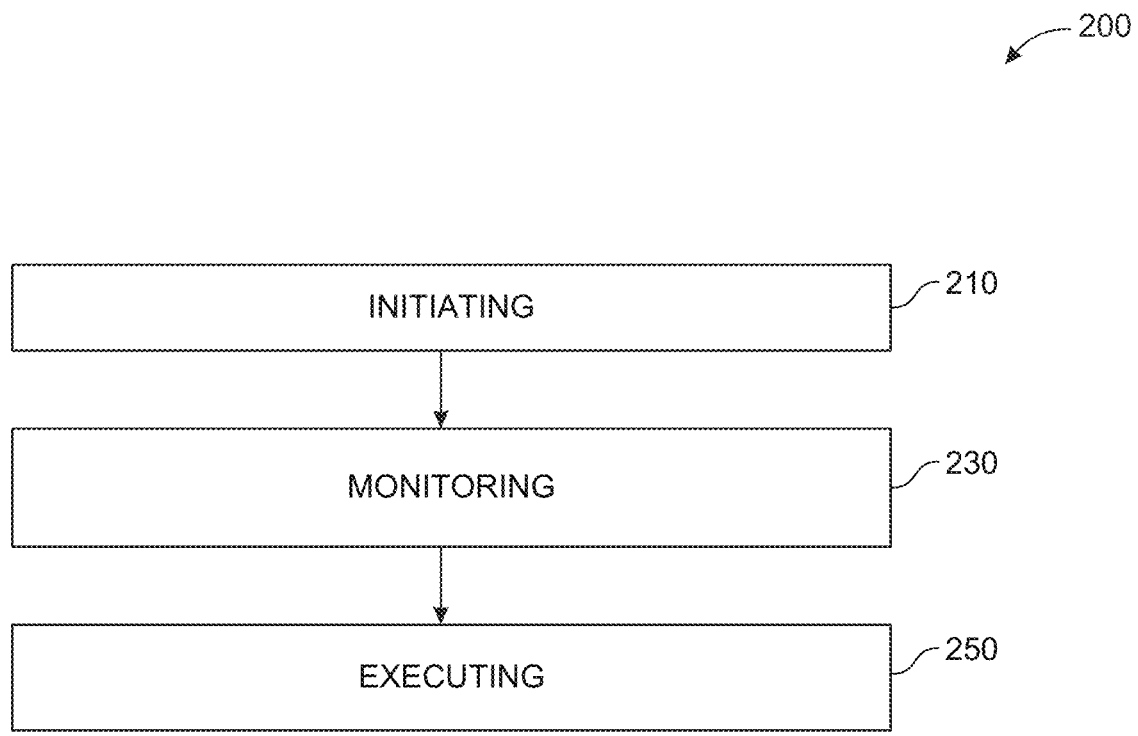
FIG. 2 is a block diagram illustrating a process flow executed by one or more processors within a local computing system according to one or more embodiments.

Turning now to FIG. 2, a block diagram illustrating a process flow 200 executed by one or more processors within a computing device according to one or more embodiments. More particularly, the process flow 200 is an example implementation of a method for guided operation by one or more robotic processes (e.g., RPAs) of a robot engine of the computing device (e.g., the computing system or environment 140 of FIG. 1). Thus, the process flow 200 involves an automatic multi-step manipulation of the computing device in connection with guided operations of at least onboarding programs and/or training sessions. Note that the onboarding programs and/or the training sessions are exemplary applications of the robot engine and the guided operations. Thus, the guided operations are not limited thereto.

The process flow 200 begins at block 210, which includes the robot engine initiating a guided operation of a platform presented by the computing device. The guided operation can be one of a set of guided operations, such as a specific series of guided operations for one or more platforms. The platform can be one of a plurality of platforms, such as an initial or first platform followed by secondary or tertiary platforms.

Generally, the platform (e.g., one or more multiple local/remote platforms) can be any one of an application within the computing device, a browser application connecting to a web-based software tool, proprietary software, file system, media, system resources, etc. Further, the platform includes operations and interactions thereof, including operations within the platform that can be monitored and/or detected and interactions by the platform with a user and/or other platforms. In this way, the guided operation operates so that the user learns how to use the platform.

According to one or more embodiments, the guided operation provides an integrated RPA-based automation solution with contextual assistance to a user (e.g., a new employee or a current employee learning new software) for navigating through multiple platforms and corresponding user interfaces and documentation during onboarding programs and/or training session. For instance, operations of a platform, user interfaces, and documentation can be automated while the robot engine attends to these operations and guides the user. More particularly, with respect to guiding, the integrated RPA-based automation solution steps through actions of the platform, functions within the user interfaces, and information of the documentation while providing context and/or reasoning (e.g., contextual assistance) for those actions, functions, and information.

At block 230, the robot engine monitors the guided operation to observe an interaction with the platform or to receive a direct input by the robot engine. The interaction can be any user input by the user into the platform. The direct input can be any user input by the user into the robot engine. Examples of user inputs include, but are not limited to, entering alphanumeric characters (e.g., a name or address, or password), speech commands, a mouse/button click, a mouse/cursor hover, pressing of keys, gesticulations, and physical movements.

At block 250, the robot engine executes additional back-end operations (in parallel and/or in sequence) to the guided operation and/or in response to the direct input. The background operations can be any operations that are independent of the guided operation itself.

The technical effects and benefits of the process flow 200, as implemented by the robot engine, include enabling automation that otherwise are not available with conventional onboarding programs and training sessions.

Figure 3:
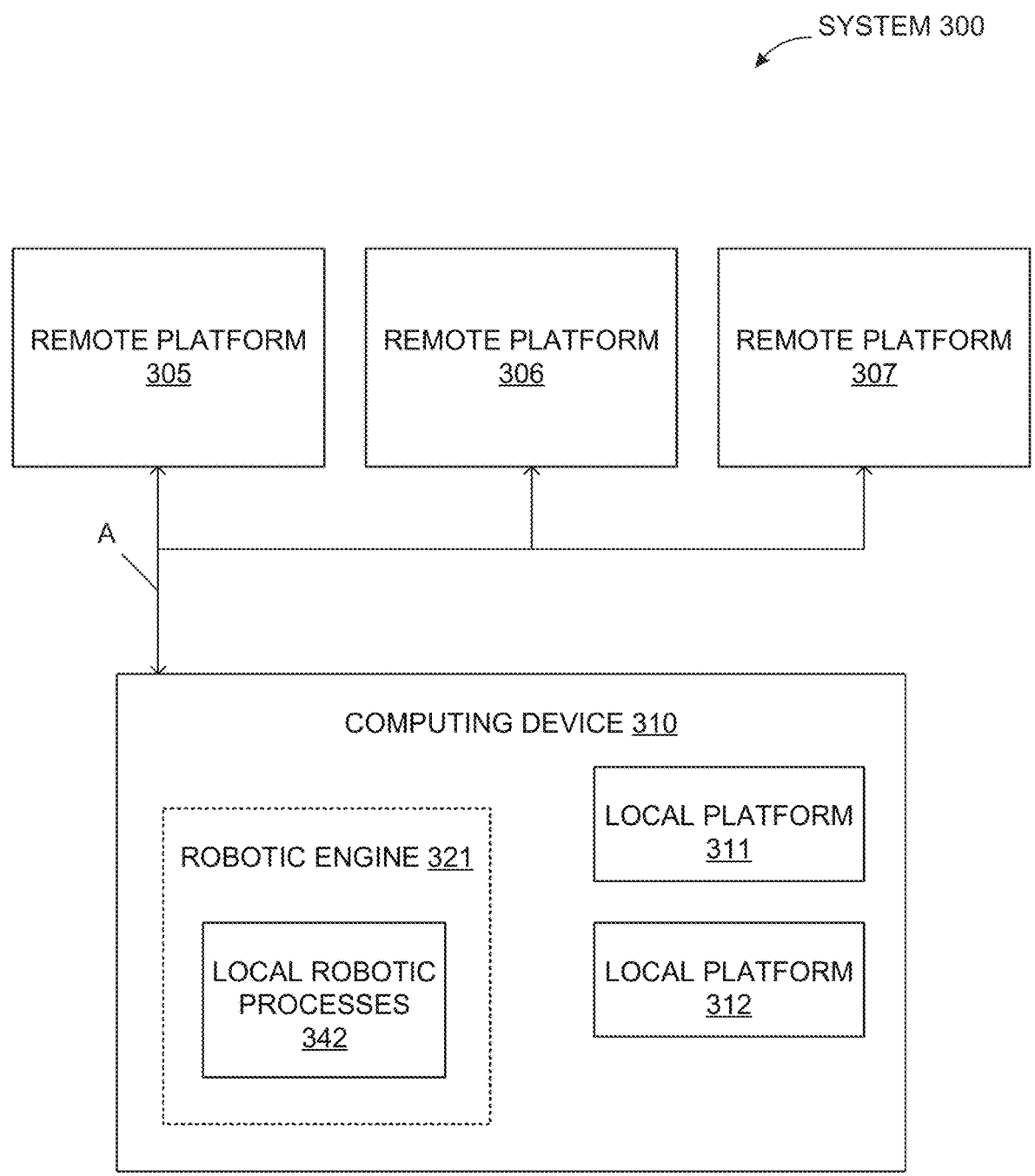
FIG. 3 is an illustration of a system according to one or more embodiments.
Figure 4:
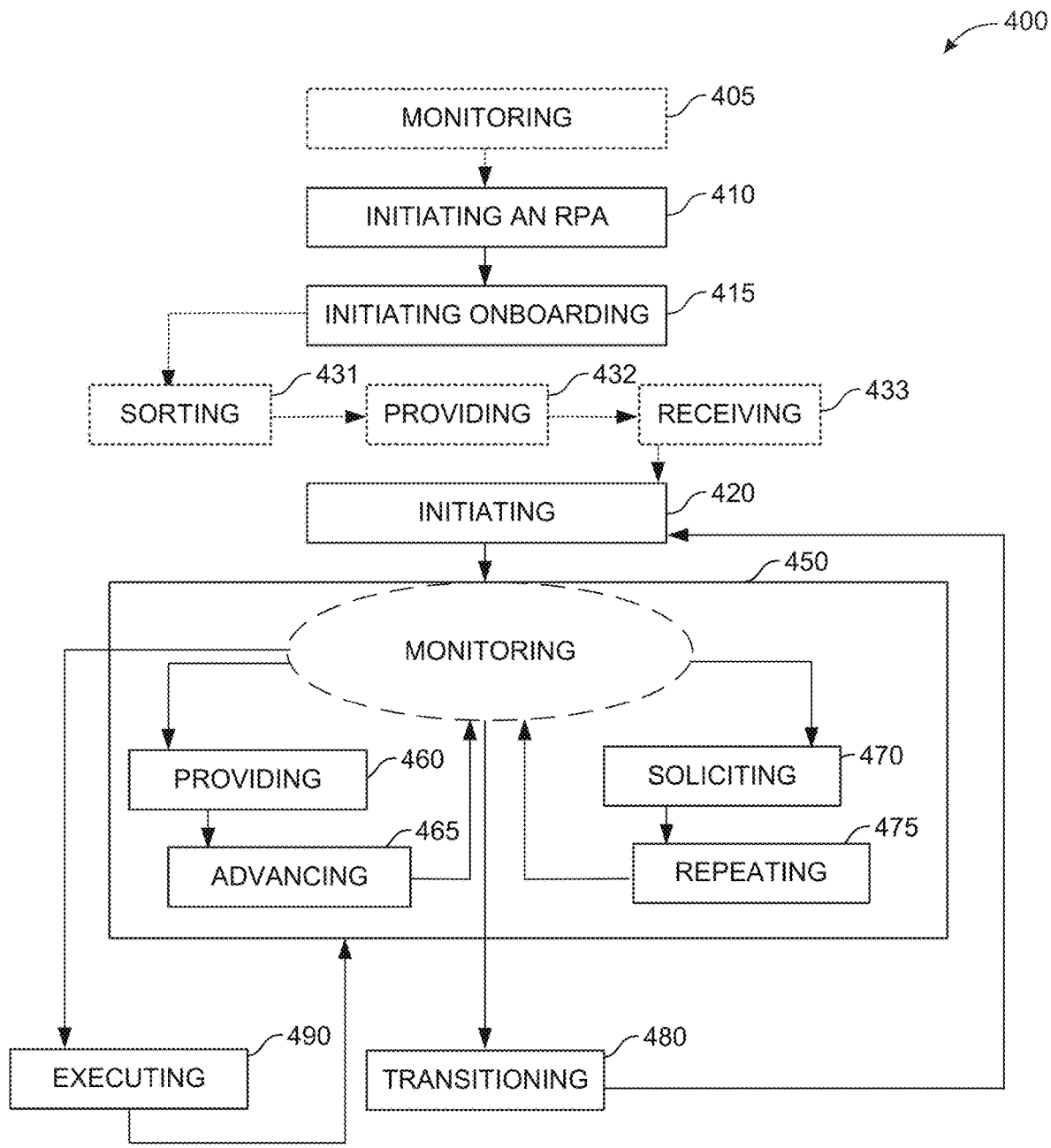
FIG. 4 is a block diagram illustrating a process flow executed by a robot engine according to one or more embodiments.

Turning now to FIGS. 3-4, components and operations of the robot engine are described according to one or more embodiments. FIG. 3 is an illustration of a system 300 (e.g., software and/or hardware that performs functions of guided operation by robotic processes). As shown in FIG. 3, the system 300 includes one or more remote platforms (as represented by remote platforms 305, 306, and 307) and a computing device 310, with one or more local platforms (as represented by local platforms 311 and 312) therein. Further, the computing device 310 can also include a robotic engine 321 implementing at least one robotic process (as represented by a local robotic process 342). Note the computing device 310 and items therein can be communicatively coupled as shown by the arrow A, which is representative of communications transmitted over wired and/or wireless connections, networks, and the like. Further, while a single block is shown for each item or component of the system 300, that single block is representative of one or more of that item or component.

The system 300 can be any computing and/or software enterprise environment or the like. The system 300 can be representative of an implementation of an office, corporate, or company network or cloud; of a manufacturing, production, or industrial network or cloud; and/or academic, research, or design network or cloud. In this regard, the computing device 310 is representative of one or more user devices (e.g., the computing system or environment 140 of FIG. 1), each including at least a processor, a memory, and a display with a user interface. Examples of the computing device 310 include, but are not limited to, a personal computer, a PDA, a cell phone, a tablet computing device, a mobile device, a desktop device and a smartphone. According to one or more embodiments, the combination of the system 300 and the computing device 310 can also be representative of and/or provide one or more software-, infrastructure-, platform-based services that provide networks, servers, storage services, operating systems, database services, and security services.

Further, the platforms (e.g., the multiple remote and local platforms 305, 306, 307, 311, and 312) of the system 300 can be any one of a local/localized application (e.g., within the computing device), a browser application (e.g., connecting to a web-based software tool), a proprietary software, a file system, media, etc. as described herein. According to one or more embodiments, the system 300 and the platforms 305, 306, 307, 311, and 312 can be considered a software package that provides day to day software function to user (e.g., employees) of some entity (e.g., a corporation). For example, the remote platform 305 can be a web-based software tool, the remote platform 306 can be a remote database, the remote platform 307 can be a cloud telephone and voice mail system, the local platform 311 can be an email application, and the local platform 312 can be a design software.

In general, the robot engine 321 can operate on one or more processors/devices/systems to support one or more guided operations by robotic processes (e.g., the local robotic process 342). According to one or more embodiments, the robot engine 321 is installed on the computing system 310 for the software package of the system 300.

For example, the robot engine 320 of the computing device 310 can include a process list of one or more distributed packaged processes and one or more configuration files. The robot engine 321 can also build the local robotic process 342 by utilizing the process list and the configuration files. The local robotic process 342, for instance, can be an automated workflow and/or robotic process automations (e.g., a robot) as described herein. The local robotic process 342 is distinct from simple application plug-ins or software scripts in that application plug-ins or software scripts are limited by their singular function and do not provide the dynamic adaptability of the local robotic process 342, as further described herein. Note that while the robot engine 321 is shown as local to the computing device 310, the robot engine 321 can also be, or in the alternative, local to any device of the system 300 or implemented as a function of a cloud.

Turning to FIG. 4, a block diagram illustrating a process flow 400 executed by the system 300 of FIG. 3 according to one or more embodiments. More particularly, the process flow 400 is an example implementation of at least one guided operation by at least one robotic process (e.g., the local robotic process 342) of the robot engine 321 of the computing device 310. Thus, the process flow 400 involves an automatic multi-step manipulation to improve the computing device 310 and user experience thereof in connection with one or more guided operations of at least onboarding programs and/or training sessions.

The process flow 400 can begin at dotted-block 405, which is optional, or at block 415. At dotted block 405, the computing device 310 works with the robot engine 321 to monitor user activity within the system 300. For example, if a user is a new employee who recently received a new user identification and password, a first log-in (e.g., user engagement/action) on a device in a corporate network is detectable by the robot engine 321. As another example, if a user is a current employee who has yet to use a specific application or a specific aspect of a web-based tool (e.g., a user opens a certain file with characteristic and prompt the user), a first user engagement/action therewith is detectable by the robot engine 321. Further, the robot engine 321 can proceed to block 410 of the process flow 400 to once the user activity is detected. Further, the robot engine 321 can proceed to provide a training session for that specific application or aspect. In this way, the robot engine 321 can dynamically and actively prompt/present guided operation as user engages aspects of the system 300, such as individual aspects of each of the platforms 305, 306, 307, 311, and 312 or these platforms themselves.

At block 410, the computing device 310 works with the robot engine 321 to initiate an RPA, such as the local robotic process 342. The initiation of the RPA can be automatic (e.g., based on date and time, based on logic of the robot engine 321, or the like) or driven by user action (e.g., as discussed in optional dotted-block 405).

At block 415, the local robotic process 342 itself, for example, then initiates an onboarding program for a user, such as a new employee or a current employee (e.g., the new employee is used herein for illustrative purposes and is not intended to be limiting). Note that the onboarding program can include separate training sessions for each of the platforms 305, 306, 307, 311, and 312. In some cases, the process flow 400 proceeds to block 420. At block 420, in sequence with initiating the onboarding program, the local robotic process 342 causes one of these training sessions to automatically begin.

Optionally, as shown by dotted-blocks 431, 432, and 433, the local robotic process 342 and/or robot engine 321 can engage the user for a direct input. For instance, at block 431, as part of initiating the onboarding program, the local robotic process 342 can sort or organize these training sessions into a specific execution sequence. According to one or more embodiments, the robot engine 342 can organize these training sessions according to a most common sequence by other users or according to most frequently selected training sessions (e.g., in view of previous monitoring by the robot engine 342 at any point in the process flow 400).

Then, at dotted-block 432, a set of user interfaces and/or menus detailing the onboarding program and the specific execution sequence can be provided by the local robotic process 342 and/or robot engine 321 to the new employee to solicit a direct input. In this way, the local robotic process 342 and/or robot engine 321 inform the user of the order of training session. The user can accept this order or select a specific training session. In an example, the direct input can identify the menu item corresponding to the local platform 311.

At dotted-block 433, the robot engine 321 receives the direct input into the set of user interfaces and/or menus, which is a selection of which training session the new employee desires to take. As indicated herein, in an example, the user can select from a menu between any of the platforms 305, 306, 307, 311, and 312 by providing a mouse click (e.g., the direct input) on a menu item corresponding to that selection.

At block 430, the robot engine 321 initiates a guided operation (whether automatically or in response to user activity). For instance, the robot engine 321 initiates a guided operation of the local platform 311 based on the direct input identifying the menu item corresponding to the local platform 311. The guided operation provides an integrated RPA-based automation solution with contextual assistance to the new employee for navigating through the local platform 311 and corresponding user interfaces and documentation.

At block 450, the robot engine 321 monitors the guided operation. In monitoring, the robot engine 321 observes the actions of the user with respect to progression of the training session of the local platform 311. For example, the robot engine 321 monitors user's actions and looks for a match per instructions coded into the guided operation. With respect to this match, the robot engine 321 is used as triggers detected mouse clicks, file system changes, keyboard presses, system resources, timing, and the like (e.g., any other interactions, any other direct inputs, and/or guided operation conclusion). In turn, the robot engine 321 or the local robotic process 342 therein (e.g., one or more robotic process automations) can advance, vary, branch, and/or alter the progress of the guided operation, the training session, or the onboarding program to a new path (e.g., an alternative path) in response to the matches (e.g., interactions, the direct inputs, and/or the conclusions).

Within monitoring the guided operation, at block 460, the local platform 311 provides pop-up menus in a GUI to confirm (e.g., or any other user interface) whether the new employee wants to advance the training session for the local platform 311. At block 465, the new employee interacts with the local platform 311, such as by clicking with a mouse cursor on the 'continue' button of that pop-up menu (e.g., or any other user interface). In this way, a user (e.g., the new employee) is clicking through a guided operation (e.g., provided by the local robotic process 342) of an application (e.g., the local platform 311), and the local robotic process 342 is seeing/observing/monitoring the clicks within the application and advancing the guided operation itself. Note that the guided operation can span multiple applications and provide guided operation using the multiple applications in conjunction with each other. For example, in a call center, a user can be directed to take data from one application and use that to input data in another application.

At another time during the guided operation of the local platform 311 (at block 470), the robot engine 321 can solicit a direct input independent of the local platform 311 in an external GUI frame, which confirms whether the user desires to repeat a portion of the training session. At block 475, the robot engine 321 can automatically direct the guided operation accordingly.

At block 480, the robot engine 341 causes a transition within the computing device 310 from the local platform 311 to a remote platform 306, which is also presented by the computing device 310. This transition can occur automatically, can be driven by the robot engine 341, and/or be driven by user inputs as described herein. In turn, the process flow 400 proceeds back to block 430, and the robot engine 321 initiates a guided operation of the remote platform 306. Note that the 'transition' of block 480 may not be a transition per se, and in some cases it can be a seamless switch between platforms 311 and 306 (e.g., as a logical progression, regardless of the locations of the platforms 311 and 306).

Additionally, at block 490, the robot engine 321 executes additional backend operations in parallel to (or in sequence with) the guided operation and/or in response to any of the interactions or direct inputs. Note that the backend operations can be retrieval of additional guided instruction, along with execution of automation. For example, a new employee can be guided to fill in a form and then an RPA automation can run in the backend to provision the new employee in the system, such as get a parking permit from a building supervisor. In some cases, the process flow 400 can proceed back to the monitoring of block 450. For instance, after executing, any of the backend operations can go back to receive instructions (as the execution thereof are fluid processes). The technical effects and benefits of the process flow 400, as implemented by the robot engine, include enabling automation that otherwise are not available with conventional onboarding programs and training sessions.

According to one or more embodiments, with reference to FIG. 4, a user engages in a guided automation to learn an update to a system. The user starts the guided automation (e.g., blocks 410 and 415), which then prompts the user with instructions and options to begin (e.g., blocks 431, 432, and 433). Once the user begins, the RPA opens (e.g., block 420) the application(s) the user is receiving instruction on and continues and/or invokes additional RPAs (e.g., block 490). As the guided automation executes, the RPAs ask the user to perform actions, such as clicking a menu item, filling in a form, clicking a button, etc. (e.g., blocks 460, 470). As the user performs these actions, by way of monitoring (e.g., block 450), the robot engine observes these actions and advances the instruction. At a point, the robot process (e.g., per the coding) can execute one or more actions (e.g., 465, 475, 480, and 490), such as directly inputting data, saving data, navigation through various screens, etc. The robot process can also give the user options to take an advanced set of steps or a simple set, giving the user the ability to choose their level of engagement.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. A computer readable medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire Examples of computer-readable media include electrical signals (transmitted over wired or wireless connections) and computer-readable storage media. Examples of computer-readable storage media include, but are not limited to, a register, cache memory, semiconductor memory devices, magnetic media such as internal hard disks and removable disks, magneto-optical media, optical media such as compact disks (CD) and digital versatile disks (DVDs), a random access memory (RAM), a read-only memory (ROM), an erasable programmable read-only memory (EPROM or Flash memory), a static random access memory (SRAM), and a memory stick. A processor in association with software may be used to implement a radio frequency transceiver for use in a terminal, base station, or any host computer.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A method implemented by a robot engine stored as program code on a memory of a system, the program code being executed by at least one processor of the system, the at least one processor being communicatively coupled to the memory within the system, the method comprising:

initiating, by one or more robotic process automations of the robot engine, a guided operation of a platform presented by the system for an onboarding program or a training session, the guided operation comprising an integrated robotic process automation-based automation solution with contextual assistance that automatically navigates a user through the platform and corresponding interfaces during the onboarding program or the training session, the guided operation and the integrated robotic process automation-based automation solution operate to enable a user to learn how to use the platform and the corresponding user interfaces, and the integrated robotic process automation-based automation solution of the guided operation comprising one or more steps identifying one or more actions of the platform, one or more functions within the corresponding user interfaces, and documentation information;

monitoring, by the one or more robotic process automations, the guided operation to observe a progression of the onboarding program or the training session, the progression comprising an interaction and a direct input received by the robot engine;

varying, by the one or more robotic process automations of the robot engine, the guided operation to an alternative path in response to the interaction or the direct input;

causing, by the robot engine, a transition within the system from the platform to a second platform presented by the system with respect to the alternative path; and executing, by the one or more robotic process automations, at least one backend operation independent of the guided operation utilizing the direct input.

2. The method of claim 1, wherein the guided operation comprises contextual assistance to the user for navigating through the platform and corresponding user interfaces and documentation.

3. The method of claim 1, wherein the interaction comprises a user input by a user into the platform, and
   wherein the direct input comprises a user input by the user into the robot engine.

4. The method of claim 1, wherein the guided operation is one of a set of guided operations for a plurality of platforms of the system, and wherein the platform is one of the plurality of platforms of the system comprising one or more of an application, a browser application, a proprietary software, a file system, media, and a system resource.

5. The method of claim 1, wherein the robot engine executes monitoring of the system to detect a user action and to initiate the guided operation based on the user action.

6. A system comprising:
   a memory storing as program code for a robot engine; and
   at least one processor executing the program code to cause the system to perform:
   initiating, by one or more robotic process automations of the robot engine, a guided operation of a platform presented by the system for an onboarding program or a training session, the guided operation comprising an integrated robotic process automation-based automation solution with contextual assistance for navigating through the platform and corresponding user interfaces during the onboarding program or the training session, the guided operation and the integrated robotic process automation-based automation solution operate to enable a user to learn how to use the platform and the corresponding user interfaces, and the integrated robotic process automation-based automation solution of the guided operation comprising one or more steps identifying one or more actions of the platform, one or more functions within the corresponding user interfaces, and documentation information;
   monitoring, by the one or more robotic process automations, the guided operation to observe a progression of the onboarding program or the training session, the progression comprising an interaction and a direct input received by the robot engine;
   varying, by the one or more robotic process automations of the robot engine, the guided operation to an alternative path in response to the interaction or the direct input;
   causing, by the robot engine, a transition within the system from the platform to a second platform presented by the system with respect to the alternative path; and
   executing, by the one or more robotic process automations, at least one backend operation with respect to the interaction or the direct input.

7. The system of claim 6, wherein the guided operation comprises contextual assistance to a user for navigating through the platform and corresponding user interfaces and documentation.

8. The system of claim 6, wherein the interaction comprises a user input by a user into the platform, and
   wherein the direct input comprises a user input by the user into the robot engine.

9. The system of claim 6, wherein the guided operation is one of a set of guided operations for a plurality of platforms of a computing environment, and
   wherein the platform is one of the plurality of platforms comprising one or more of an application, a browser application, a proprietary software, a file system, media, and a system recourse.

10. The method of claim 1, wherein the guided operation automates operations of the platform and the corresponding user interfaces while the robot engine guides the user.

11. The method of claim 10, wherein automation the operations of the platform by the guided operation comprises stepping through actions of the platform and functions within the corresponding user interfaces by the integrated robotic process automation-based automation solution.

12. The method of claim 11, wherein guiding the user by the robot engine comprises providing reasoning for the actions of the platform and the functions of the corresponding user interfaces through one or more user interfaces.

13. The method of claim 1, wherein the direct input comprises a user input into a form for a new user.

14. The method of claim 1, wherein the at least one backend operation independent of the guided operation comprises a provisioning of a new user based on the direct input.

15. The method of claim 1, wherein the contextual assistance comprises context and reasoning for the one or more steps and the one or more functions.

16. The method of claim 1, wherein the robot engine monitors the interactions and the direct input for a match per instructions coded into the guided operation.

17. The method of claim 1, wherein the robot engine utilizes one or more triggers comprising detected mouse clicks, file system changes, or keyboard presses corresponding to the interactions or the direct input to vary the guided operations and cause the transition.

18. The method of claim 1, wherein the robot engine solicits a direct input independent of the guided operations in an external interface frame to confirm whether to repeat a portion of the onboarding program or the training session.

* * * * *